(12) United States Patent
Hirose (10) Patent No.: US 6,680,747 B1
(45) Date of Patent: Jan. 20, 2004

(54) IMAGE PROCESSING APPARATUS AND IMAGE PROCESSING METHOD

(75) Inventor: Hisataka Hirose, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/884,061

(22) Filed: Jun. 27, 1997

(30) Foreign Application Priority Data

Jul. 2, 1996 (JP) ............................................. 8-172256

(51) Int. Cl.$^7$ .......................... H04N 5/225; H04N 9/74
(52) U.S. Cl. ..................................... 348/220.1; 348/578
(58) Field of Search ................................ 348/220, 559, 348/560, 578, 220.1; 386/33, 109

(56) References Cited

U.S. PATENT DOCUMENTS

| | | | | |
|---|---|---|---|---|
| 4,163,249 A | * | 7/1979 | Michael et al. | 348/580 |
| 5,034,816 A | * | 7/1991 | Morita et al. | 348/559 |
| 5,132,798 A | * | 7/1992 | Yoshimura et al. | 348/239 |
| 5,270,810 A | * | 12/1993 | Nishimura | 348/65 |
| 5,333,015 A | * | 7/1994 | Harigaya et al. | 348/578 |
| 5,345,264 A | * | 9/1994 | Murata et al. | 348/235 |
| 5,497,244 A | * | 3/1996 | Chargin, Jr. et al. | 386/109 |
| 5,519,448 A | * | 5/1996 | Nagasawa et al. | 348/559 |

FOREIGN PATENT DOCUMENTS

| | | | | |
|---|---|---|---|---|
| EP | 497428 | * | 8/1992 | H04N/7/18 |
| JP | 06-038158 | * | 2/1994 | H04N/5/907 |

* cited by examiner

*Primary Examiner*—Aung Moe
*Assistant Examiner*—Luong Nguyen
(74) *Attorney, Agent, or Firm*—Robin, Blecker & Daley (57) ABSTRACT

An image processing apparatus comprises a first input part for inputting a video signal, a second input part for inputting a control signal indicative of a special effect mode to be applied to the video signal, a compressing part for compressing the video signal inputted by the first input part, a memory part for storing the video signal, and a memory control part for, according to the control signal, causing the memory part to selectively store the video signal compressed by the compressing part and a video signal not compressed by the compressing part.

8 Claims, 5 Drawing Sheets

FIG. 1

FIG. 2(a) INPUT DATA (8 BITS)

FIG. 2(b) COMPRESSED DATA (4 BITS)

FIG. 2(c) BIT MULTIPLEX (8 BITS)

FIG. 2(d) ADDRESS

FIG. 2(e) WE

FIG. 2(f) RECORDED DATA

IMAGE PROCESSING APPARATUS AND IMAGE PROCESSING METHOD

BACKGROUND OF THE INVENTION

1. Field of the Invention

The present invention relates to an image processing apparatus and, more particularly, to an image processing apparatus which applies various special effects to, for example, an NTSC or PAL system television signal.

2. Description of Related Art

An image processing apparatus which realizes various special effects by using a field memory has heretofore been proposed. For example, the field memory is used for realizing special effects such as a still image display (a freeze effect), a stroboscopic effect, an electronic zoom effect which enlarges and displays a portion of an image, and a field-cyclic noise reducer.

Among these special effects, the still image display using a video signal for one field involves a large degradation of image quality, and various methods of improving the image quality of the still image display have heretofore been proposed.

(1) There is a method of writing the video signal of an input moving image into a frame memory and, after that, reading the video signal from the frame memory for displaying purpose. In this method, since no vertical resolution degradation occurs in a portion in which a subject is stationary, a degradation in image quality does not occur. However, since the required memory capacity is twice as large as the capacity of a field memory, there is a problem such as an increase in cost.

(2) There is a method using a field memory. For example, during reading, a signal is read without modification in the case of an odd field, whereas an interpolation signal is generated from the signals on adjacent horizontal lines in the case of an even field and the interpolation signal is outputted. In this method, although there is no image shake due to a motion between fields, a vertical resolution is degraded and the resultant image quality is inferior to the image quality of an apparatus using a frame memory.

The still image display method for the conventional image processing apparatus has a number of problems. In the case of an apparatus using a field memory, a vertical resolution is degraded, so that image quality is degraded. If a frame memory is used for improving image quality, two field memories are needed, so that the problem of a cost increase occurs.

BRIEF SUMMARY OF THE INVENTION

In the light of the above-described background, an object of the present invention is to provide an image processing apparatus and an image processing method both of which can realize special effects such as still image display of high quality and enlarged display without the need to increase the required memory capacity.

To achieve the above object, in accordance with one aspect of the present invention, there is provided an image processing apparatus which comprises first input means for inputting a video signal, second input means for inputting a control signal indicative of a special effect mode to be applied to the video signal, compressing means for compressing the video signal inputted by the first input means, memory means for storing the video signal, and memory control means for, according to the control signal, causing the memory means to selectively store the video signal compressed by the compressing means and a video signal not compressed by the compressing means.

In accordance with another aspect of the present invention, there is provided an image processing method for applying a special effect to a video signal by using a memory, which method comprises a first input step of inputting the video signal, a second input step of inputting a control signal indicative of a special effect mode to be applied to the video signal, a compressing step of compressing the input video signal, and a memory control step of, according to the control signal, causing the memory to selectively store the video signal compressed in the compressing step and a video signal not compressed in the compressing step.

Other objects, features and advantages of the invention will become apparent from the following detailed description taken in conjunction with the accompanying drawings.

DETAILED DESCRIPTION OF THE INVENTION

Preferred embodiments of an image processing apparatus according to the present invention will be described below in detail with reference to the accompanying drawings.

First Embodiment

Figure 1:
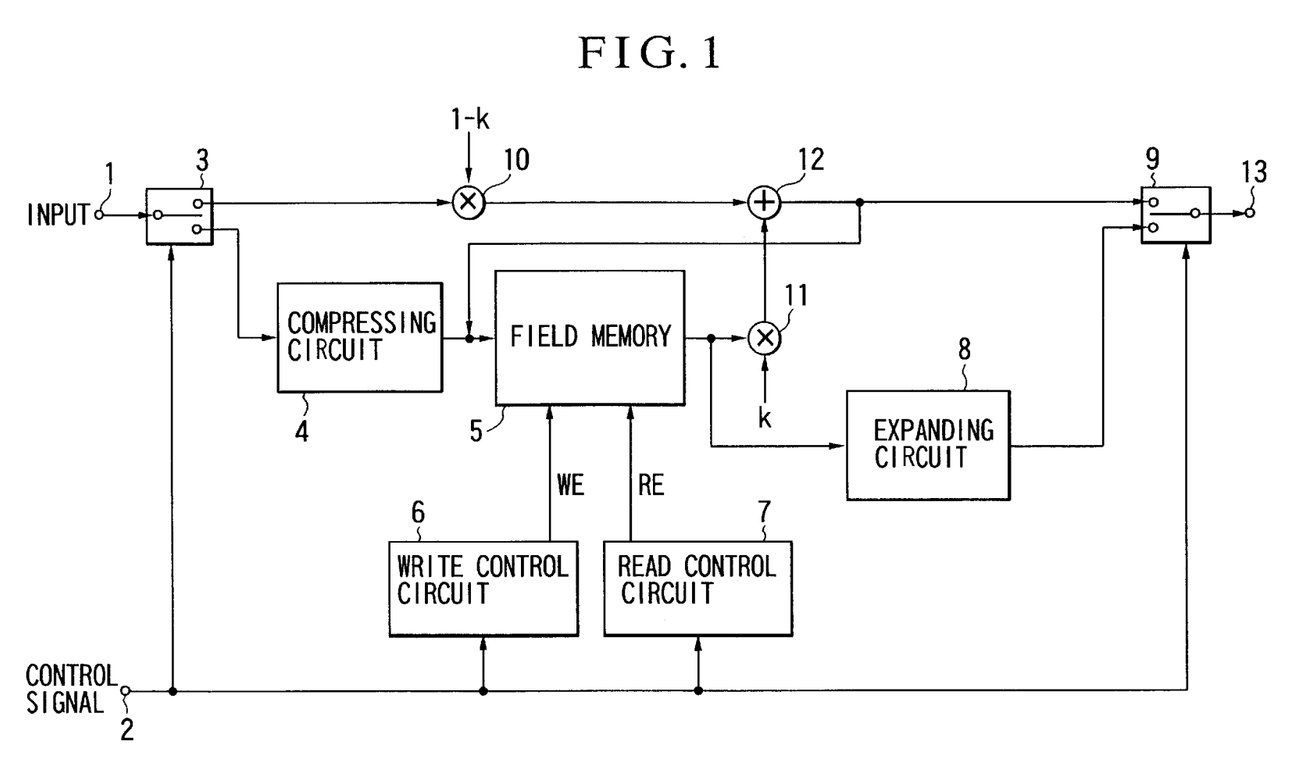
FIG. 1 is a block diagram showing the arrangement of an image processing apparatus according to a first embodiment of the present invention.

FIG. 1 is a block diagram showing the arrangement of an image processing apparatus according to a first embodiment of the present invention.

The arrangement shown in FIG. 1 includes a first input terminal 1 through which to input a video signal, a second input terminal 2 through which to input a control signal for controlling a special effect mode inputted from an operating part (not shown), selecting switches 3 and 9, a compressing circuit 4 provided as compressing means for compressing a video signal supplied via the selecting switch 3 to the amount of information which is less than or equal to half of the original amount of information, a field memory 5 for storing the video signal, a write control circuit 6 for generating a write control signal for writing the video signal into the field memory 5, a read control circuit 7 for reading the video signal written in the field memory 5, and an expanding circuit 8 for restoring the compressed video signal read from the field memory 5 to its original state.

The arrangement shown in FIG. 1 also includes a multiplier 10 for multiplying a video signal by (1−k) and a multiplier 11 for multiplying the output of the field memory 5 by k. k is a constant which satisfies $0 \leq k \leq 1$.

The arrangement shown in FIG. 1 also includes an adder 12 for adding together the outputs of the multipliers 10 and 11, and an output terminal 13 through to output the video signal.

The operation of the image processing apparatus according to the first embodiment having the above-described arrangement will be described below.

First of all, the operation of the image processing apparatus in a normal mode (for example, during recording) will be described below.

A video signal inputted through the first input terminal 1 is supplied to the multiplier 10 via the switch 3. The multiplier 10 multiplies the input video signal by (1−k). The multiplier 11 multiplies the output of the field memory 5 by k. The outputs of the multipliers 10 and 11 are added together by the adder 12, and the sum is outputted to the field memory 5 and the switch 9. The sum supplied to the switch 9 is outputted to the outside through the output terminal 13.

An 8-bit video signal is sequentially written to and read from the field memory 5 in accordance with the address signals outputted from the write control circuit 6 and the read control circuit 7.

In other words, in the normal mode, the field memory 5 is used as a field-cyclic noise reducer.

The following is a description of the operation of the image processing apparatus when a still image display mode is selected during reproduction.

A video signal inputted through the first input terminal 1 is inputted to the compressing circuit 4 via the switch 3.

The compressing circuit 4 compresses the video signal to the amount of information which is equal to or less than half of the original amount of information. Various methods such as DPCM (Differential Pulse Code Modulation), JPEG (Joint Photographic Experts Group) and MPEG (Moving Picture Experts Group) have heretofore been proposed as compressing methods for video signals. The following example employs compression based on DPCM which can be realized with a smallest circuit scale.

Specifically, in the first embodiment, compression based on DPCM is employed to compress gradation information from 8 bits (256 gray levels) to 4 bits (16 gray levels), so that the video signal is compressed to not greater than half of the original amount of information. To efficiently write the compressed video signal into the field memory 5, the compressed video signal is outputted after subjected to the bit multiplex processing of multiplexing the first 4-bit data of the 4-bit compressed video signal onto the lower-order 4 bits of 8 bits, and the next 4-bit data onto the higher-order 4 bits of 8 bits.

When the still image display mode is selected, the data is written to odd or even addresses of the field memory 5 at the timing shown in FIGS. 2(a) to 2(f).

Figures 2A, 2B:
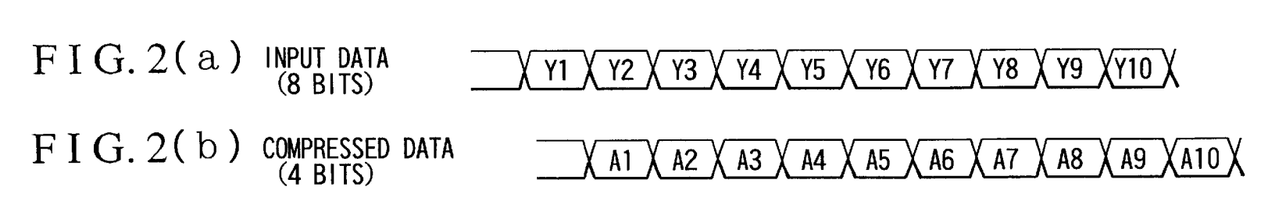
FIGS. 2(a) to 2(f) are views showing the timing of writing to a memory/in the first embodiment.

FIG. 2(a) shows the video signal inputted to the first input terminal 1, and FIG. 2(b) shows the video signal compressed by the compressing circuit 4.

Figure 2C:
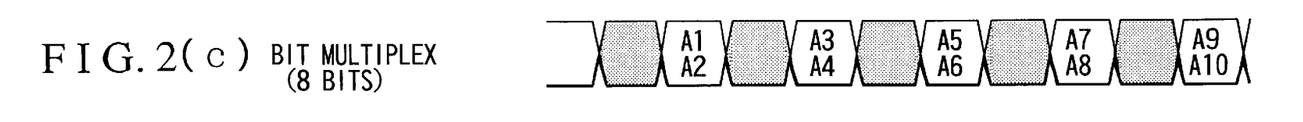
Figure 2D:
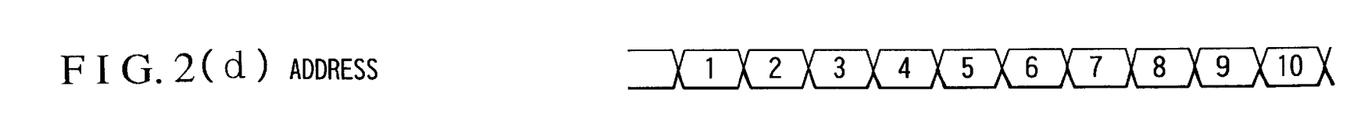
Figures 2E, 2F:
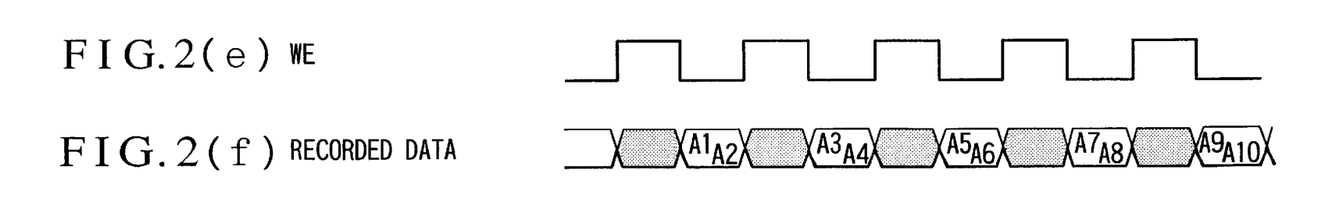

FIG. 2(c) shows the state in which the compressed video signal is bit-multiplexed onto 8 bits, and FIG. 2(d) shows a write address signal to be inputted to the field memory 5. FIG. 2(e) shows the operation of a write control signal (WE), and FIG. 2(f) shows the state of the signal written in the field memory 5.

When the still image display mode is selected, the compressed video signal is sequentially written to odd or even addresses of the field memory 5 under control carried out at the timing shown in FIGS. 2(a) to 2(f). For example, if the video signal of an odd field is written into odd addresses of the field memory 5, the write control signal (WE) is controlled so that the video signal of an even field is written into even addresses of the field memory 5. By carrying out this control, the compressed video signal for one frame is completely stored in the field memory 5.

When the stored video signal is to be read from the field memory 5, control similar to the write control is carried out by using a control signal (RE) outputted from the read control circuit 7.

Figure 3A:
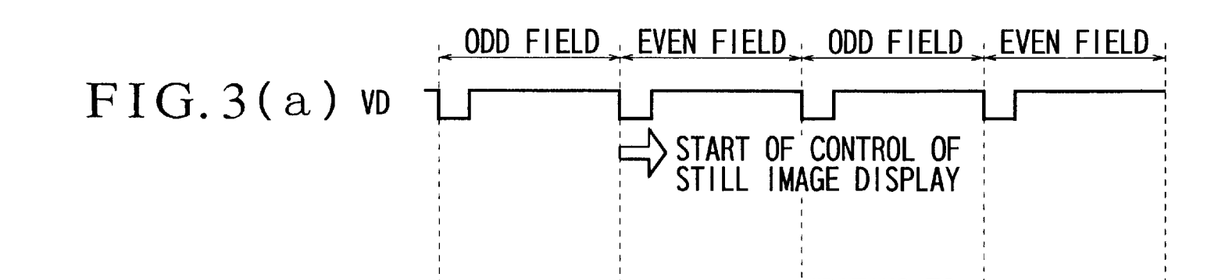
FIGS. 3(a) to 3(c) are views showing the timing of a write control signal and a read control signal in the first embodiment.
Figure 3B:
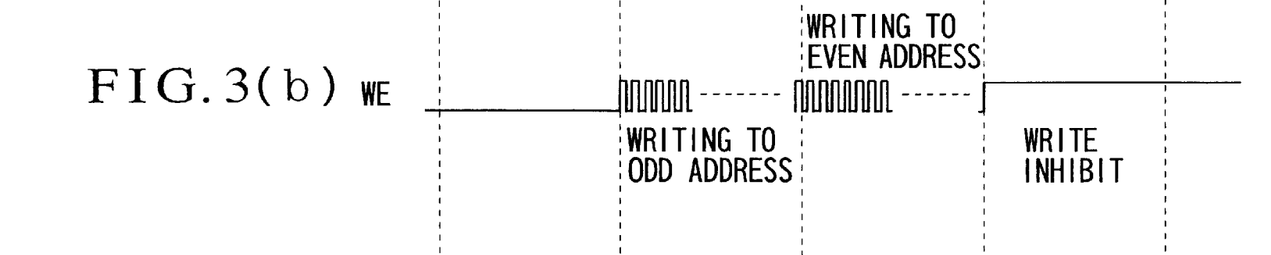
Figure 3C:
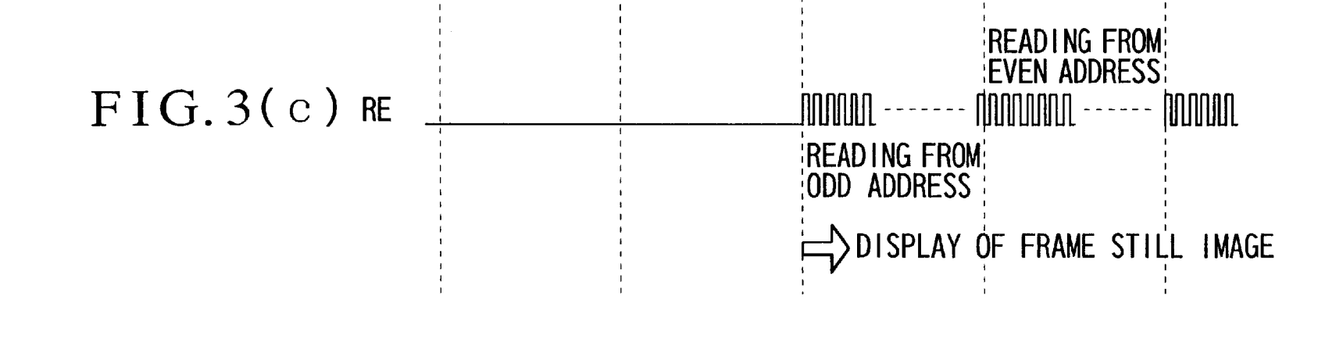

FIGS. 3(a) to 3(c) show the manner of operation of read control.

FIG. 3(a) shows the video signal, FIG. 3(b) shows the operation of the write control signal (WE), and FIG. 3(c) shows the operation of the read control signal (RE).

If the video signal shown in FIG. 3(a) is inputted and the still image display mode is selected at the timing of the start of an odd field, the write control signal (WE) for writing the video signal into the field memory 5 operates according to the waveform shown in FIG. 3(b), and the video signal is written for only the period of 2 fields and, after that, writing is inhibited.

The read control signal (RE) operates according to the waveform shown in FIG. 3(c), and the reading of the. video signal written in the field memory 5 is started at a timing which is delayed by one field, so that the data stored in odd and even addresses are read alternately from field to field.

The compressed video signal read from the field memory 5 in this manner is inputted into the expanding circuit 8 and restored into the original video signal. The restored original video signal is outputted through the output terminal 13 via the switch 9.

The write control circuit 6 may also be arranged to compress the luminance signal of a video signal for two fields and write the compressed signal into the field memory 5 and to compress the color-difference signal of a video signal for one field and write the compressed signal into the field memory 5.

Second Embodiment

A second embodiment will be described below with reference to an example which has an enlarged display mode as a special effect mode.

Figure 4:
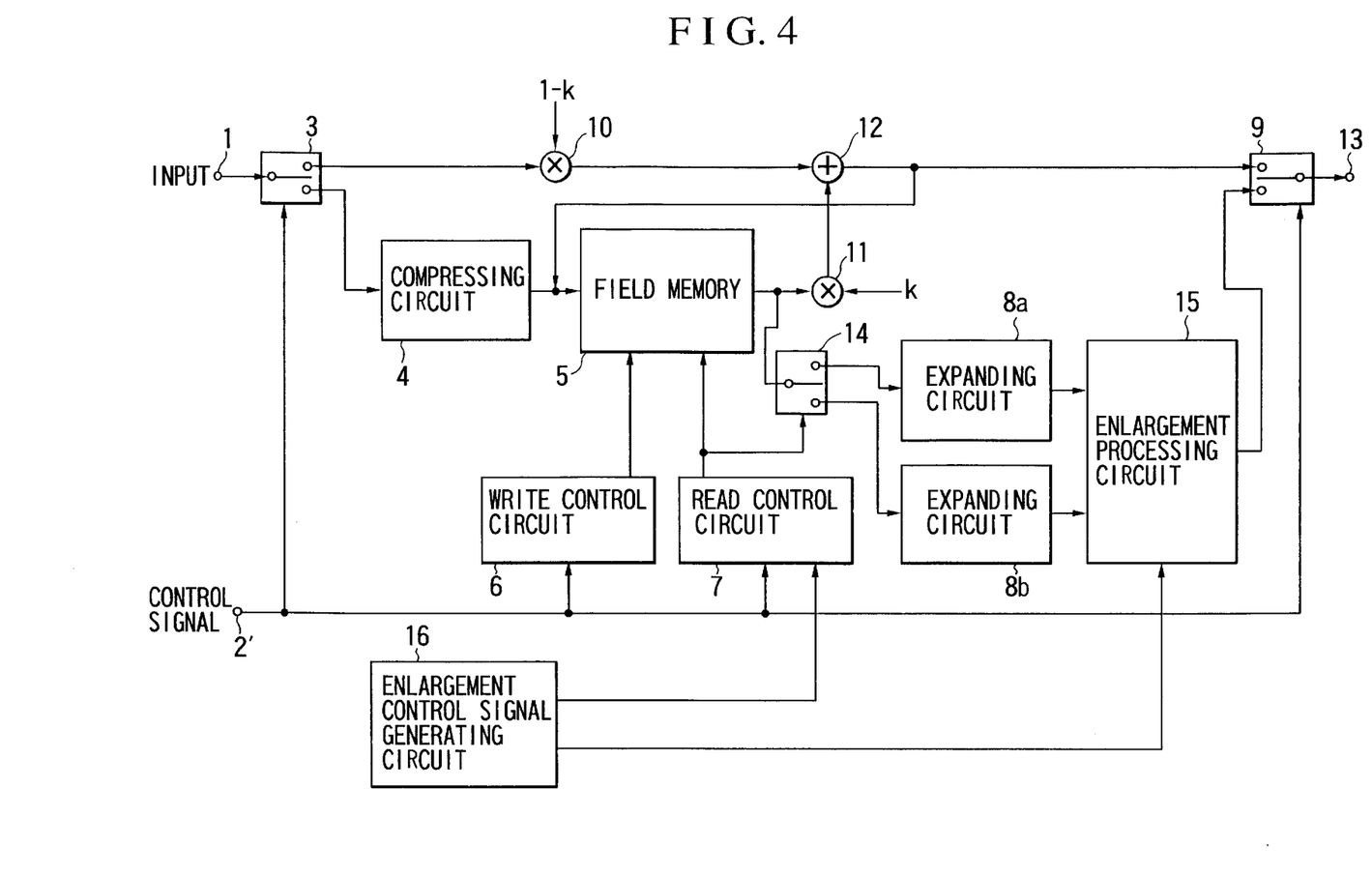
FIG. 4 is a block diagram showing the arrangement of an image processing apparatus according to a second embodiment of the present invention.

FIG. 4 is a block diagram showing the arrangement of an image processing apparatus according to the second embodiment of the present invention. In FIG. 4, identical reference numerals are used to denote constituent elements identical to those shown in FIG. 1, and since the arrangement shown in FIG. 4 is similar to that described above in connection with the first embodiment, detailed description is omitted.

The arrangement shown in FIG. 4 includes expanding circuits 8a and 8b for restoring a 4-bit compressed video signal into the original state (8 bits).

The arrangement shown in FIG. 4 also includes a second input terminal 2' through which to input a control signal for selecting the normal mode or the enlarged display mode inputted from an operating part (not shown), a separating circuit 14 for separating a signal read from the field memory 5 into a compressed video signal of an odd field and a compressed video signal of an even field, both compressed video signals being time-multiplexed in the signal read from the field memory 5, an enlargement processing circuit 15 for enlarging and displaying a portion of an image from the video signal of the odd field and the video signal of the even field, an enlargement control signal generating circuit 16 for generating a control signal for providing an enlarged display.

The operation of the image processing apparatus having the above-described arrangement will be described below.

Since the second embodiment in the normal mode is controlled similarly to the first embodiment in the normal mode, the description thereof is omitted.

The following description is made in connection with a case in which a control signal indicative of the enlarged display mode is inputted through the second input terminal 2'.

The video signal inputted through the first input terminal 1 is inputted into the compressing circuit 4 via the switch 3 and compressed by the compressing circuit 4, and the compressed video signal is stored in the field memory 5. This processing is similar to that of the first embodiment.

The operation of reading the compressed video signal from the field memory 5 is different from that of the first embodiment. The signals stored in both even and odd addresses are read at the same time, and these signals are separated into the signal of an odd field and the signal of an even field by the separating circuit 14.

The separated signals are respectively restored into the video signal of the odd field and the video signal of the even field by the expanding circuits 8a and 8b, and these video signals are inputted into the enlargement processing circuit 15.

Figure 5:
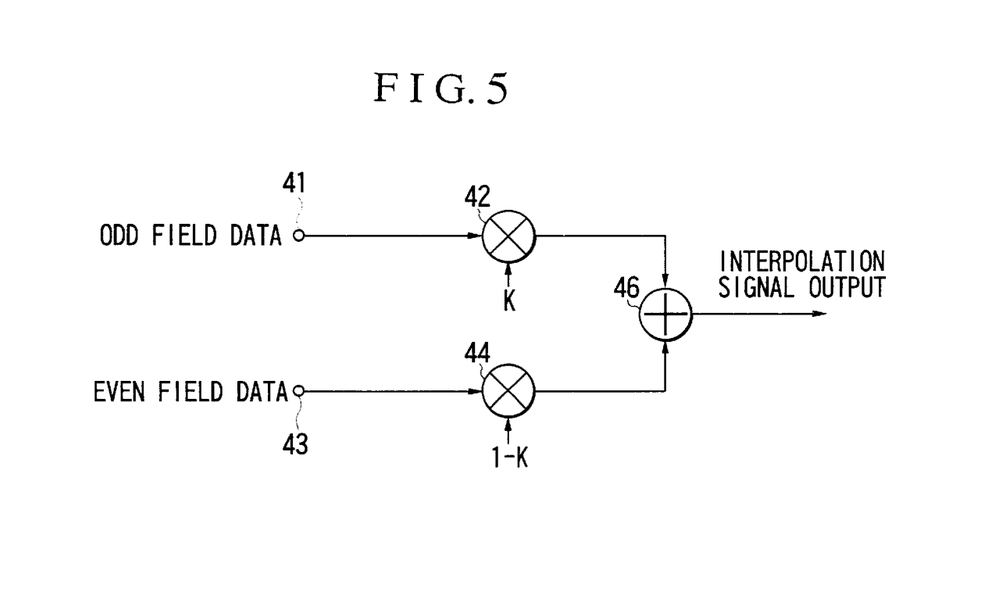
FIG. 5 is a block diagram showing the details of an enlargement processing circuit 15.

FIG. 5 shows the arrangement of the enlargement processing circuit 15. The arrangement shown in FIG. 5 includes a first input terminal 41, a second input terminal 43, a multiplier 42 for multiplying the video signal of the odd field by an enlarging coefficient K ($0 \leq K \leq 1$) which is the output signal of the enlargement control signal generating circuit 16, and a multiplier 44 for multiplying the video signal of the even field by an enlarging coefficient (1−K) which is the output signal of the enlargement control signal generating circuit 16.

An adder 46 is provided for adding together the output signal of the multiplier 42 and the output signal of the multiplier 44. The enlargement processing circuit 15 performs linear interpolation processing using the coefficients (K and 1−K) according to an enlargement ratio on the basis of adjacent pixels in each of the odd-field video signal and the even-field video signal in a picture, thereby generating an enlarged video signal.

Since conventional interpolation processing has been performed on the basis of adjacent pixels in a field, a vertically enlarged image is inferior in image quality to a horizontally enlarged image. However, in the second embodiment, since a frame signal is employed, the image quality is improved to a great extent.

As described above, according to each of the first and second embodiments, when a special image effect using a field memory is to be carried out, the control method for the field memory is changed according to the mode of special effect. During the state of normal use, the field memory is used as a field memory for storing a video signal for one field, whereas when a special effect such as a still image display and an electronic zoom processing for enlarging and displaying a portion of an image, the field memory is controlled to store a compressed video signal for two fields in which a video signal is compressed. Accordingly, it is possible to prevent a vertical resolution degradation without increasing the capacity of the field memory, so that it is possible to realize a special effect such as a high-quality still image display and an enlarged display by using a small memory capacity.

Figure 6:
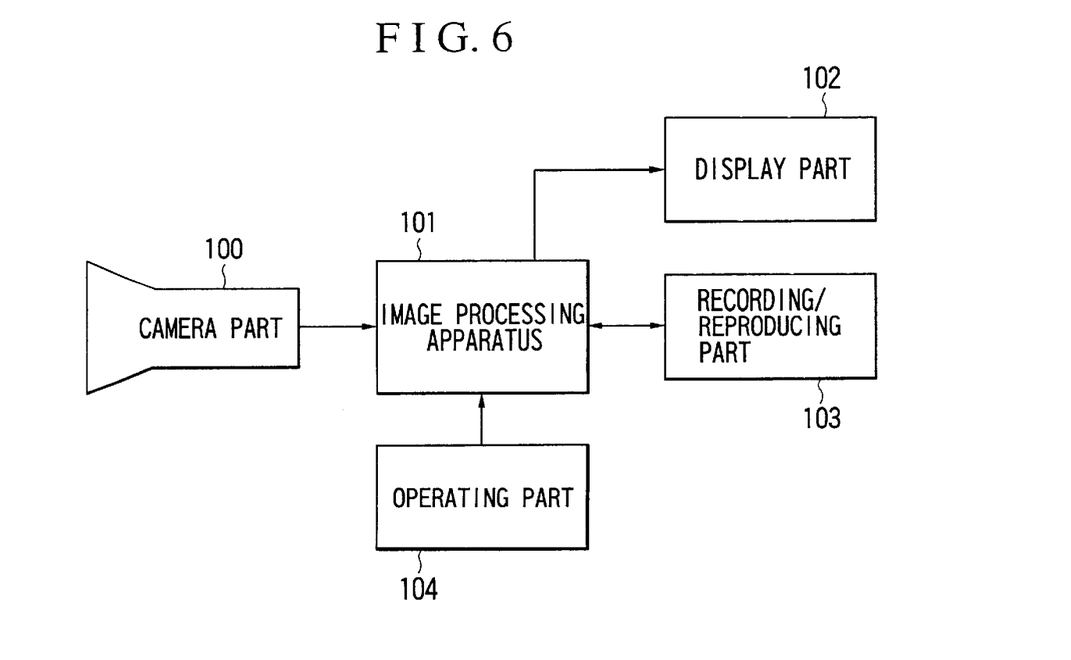
FIG. 6 is a block diagram showing the arrangement of a camera-integrated type digital video camera having the image processing apparatus according to the first or second embodiment.

Incidentally, if the image processing apparatus of the first or second embodiment is used in a camera-integrated type digital video camera as shown in FIG. 6, it is possible to realize a high-image-quality special effect on a picked-up video signal without the need to increase costs.

The arrangement shown in FIG. 6 includes a camera part 100 for converting a subject image into an electrical signal and an image processing apparatus 101 for performing the processing described previously in connection with the first or second embodiment.

The arrangement shown in FIG. 6 also includes a display part 102 for displaying the video signal processed by the image processing apparatus 101 by means of a liquid crystal monitor or the like, a recording/reproducing part 103 for encoding the video signal processed by the image processing apparatus 101 into a compressed video signal by using DCT (discrete cosine transform) conversion and recording the compressed video signal on a recording medium and also reproducing the recorded video signal, and an operating part 104 for selecting a special effect mode and generating the aforesaid control signal.

The operation of the camera-integrated type digital video camera will be described below.

A video signal picked up by the camera part 100 is inputted to the image processing apparatus 101, and the processing described previously in connection with the first or second embodiment is performed according to a special effect mode indicated from the operating part 104.

The video signal processed by the image processing apparatus 101 is outputted to the display part 102 or the recording/reproducing part 103, so that the video signal is visually displayed or recorded on a recording medium.

The video signal reproduced by the recording/reproducing part 103 can be outputted to the image processing apparatus 101, so that special effect processing can also be performed during reproduction.

The foregoing description of the embodiments has been given for illustrative purposes only and not to be construed as imposing any limitation in every respect.

The scope of the invention is, therefore, to be determined solely by the following claims and not limited by the text of the specification, and alterations made within a scope equivalent to the scope of the claims fall within the true spirit and scope of the invention.

What is claimed is:

1. An image processing apparatus, comprising:
   (a) an inputting unit, arranged to input image data comprising a field image successively;
   (b) a data processor including
       a common field memory, image data compressor and image data expander, said data processor having a first function to remove noise of the image data by using said common field memory, and a second function to store image data of plural field images compressed by said image data compressor in said common field memory and to produce still image data by using the image data of the plural field images stored in said common field memory,
       wherein, when said data processor is operated by the first function, said data processor stores the image data in said common field memory without compressing the image data;

said data processor composes the image data of plural field images in a compressed state on said common field memory in the second function and reads said composed image data out of said common field memory and expands them by said image data expander to generate the still image data; and c) a controller, arranged to control execution of the first function and the second function to said data processor.

2. An apparatus according to claim 1, wherein said image data compressor compresses a data amount of the plural field images into a data amount of one field image.

3. An apparatus according to claim 1, wherein said data processor performs control to write first-field image data compressed by said image data compressor to an odd write address of said common field memory and to write a second field-image data compressed by said image data compressor to an even write address of said common field memory.

4. An apparatus according to claim 1, wherein said common field memory is composed of n bits, and said data processor performs control to write a compressed first-field image data to high-order (n/2) bits of said common field memory and to write a compressed second-field image data to a low-order (n/2) bits of said common field memory.

5. An apparatus according to claim 1, wherein the image data is color image data.

6. An apparatus according to claim 1, wherein said inputting unit includes an image pickup unit, arranged to pick up an image of a subject and output the image data.

7. An apparatus according to claim 6, wherein said image processing apparatus is a video camera.

8. A method of image processing comprising the steps of:

(a) inputting image data comprising a field image successively;

(b) processing the image data by using a common field memory, image data compressor and image data expander, said data processing step having a first function to remove noise of the image data by using said common field memory, and a second function to store image data of plural field images compressed by said image data compressor in said common field memory and to produce still image data by using the image data of the plural field images stored in said common field memory, wherein, when said data processing step is operated by the first function, the data processing step stores the image data in said common field memory without compressing the image data, said data processing step composes the image data of plural field images in a compressed state on said common field memory in the second function and reading said composed image data out of said common field memory and expanding them by said image data expander to generate the still image data; and (c) controlling execution of the first function and the second function of said data processing step.

* * * * *

UNITED STATES PATENT AND TRADEMARK OFFICE
CERTIFICATE OF CORRECTION

PATENT NO. : 6,680,747 B1 Page 1 of 1
DATED : January 20, 2004
INVENTOR(S) : Hisataka Hirose

It is certified that error appears in the above-identified patent and that said Letters Patent is hereby corrected as shown below:

Column 2,
Line 27, delete "memory/in" and insert -- memory in --.

Column 4,
Line 29, delete "of the. video" and insert -- of the video --.

Signed and Sealed this

Twenty-eighth Day of February, 2006

JON W. DUDAS
*Director of the United States Patent and Trademark Office*